(12) United States Patent
Hwang et al.

(10) Patent No.: US 9,096,941 B2
(45) Date of Patent: Aug. 4, 2015

(54) ELECTROLYTIC CELL FOR FLOW THROUGH-CONTINUOUS DEIONIZATION

(71) Applicants: The Industry & Academic Cooperation in Chungnam National University, Daejeon (KR); Pusan National University Industry-University Cooperation Foundation, Pusan (KR)

(72) Inventors: Teak Sung Hwang, Daejeon (KR); Sung-Gyu Park, Daejeon (KR); Hui-Man Park, Daejeon (KR); Noh-Seok Kwak, Daejeon (KR); Chi Won Hwang, Daejeon (KR); Chang-Sik Ha, Busan (KR)

(73) Assignees: The Industry & Academic Cooperation in Chungnam National University, Pusan (KR); Pusan National University Industry-University Cooperation Foundation, Pusan (KR)

( * ) Notice: Subject to any disclaimer, the term of this patent is extended or adjusted under 35 U.S.C. 154(b) by 339 days.

(21) Appl. No.: 13/652,866

(22) Filed: Oct. 16, 2012

(65) Prior Publication Data

US 2013/0277210 A1    Oct. 24, 2013

(30) Foreign Application Priority Data

Apr. 12, 2012    (KR) .......................... 10-2012-0037770

(51) Int. Cl.
| | | |
|---|---|---|
| *C25B 9/18* | (2006.01) | |
| *C25B 15/08* | (2006.01) | |
| *C25B 9/00* | (2006.01) | |
| *C25B 15/00* | (2006.01) | |
| *C25D 17/00* | (2006.01) | |
| *C25C 7/00* | (2006.01) | |
| *C02F 1/469* | (2006.01) | |

(52) U.S. Cl.
CPC ............ *C25C 7/00* (2013.01); *C02F 1/4695* (2013.01)

(58) Field of Classification Search
CPC ............ C25B 9/18; C25B 15/08; C25B 9/00; C25B 15/00; C25D 17/00
USPC .................................. 204/263, 267, 627, 242
See application file for complete search history.

(56) References Cited

U.S. PATENT DOCUMENTS

2010/0326833 A1*    12/2010    Messalem et al. ............ 204/632

FOREIGN PATENT DOCUMENTS

| JP | 61247999 A | 11/1986 |
|---|---|---|
| JP | 725278 Y2 | 6/1995 |
| JP | 200061322 A | 2/2000 |
| JP | 2004195294 A | 7/2004 |
| JP | 20057348 A | 1/2005 |
| JP | 2011519306 A | 7/2011 |
| KR | 19970014811 A | 4/1997 |
| KR | 1019950020622 B1 | 3/1998 |
| KR | 100827929 B1 | 5/2008 |
| WO | 2009077992 A2 | 6/2009 |

* cited by examiner

*Primary Examiner* — Zulmariam Mendez
(74) *Attorney, Agent, or Firm* — The Webb Law Firm (57) ABSTRACT

The present invention relates to an electrolytic cell for an FT-CDI including: an injection port into which a bead and a concentrate are injected and a discharge port through which the bead and the concentrate are discharged to circulate the bead, thereby preventing the concentration of the bead from being degraded and disposes a mesh at a place in which the concentrate and the bead are received to disperse the concentrate and the bead well.

3 Claims, 6 Drawing Sheets

ELECTROLYTIC CELL FOR FLOW THROUGH-CONTINUOUS DEIONIZATION

CROSS-REFERENCE TO RELATED APPLICATIONS

This application claims priority under 35 U.S.C. §119 to Korean Patent Application No. 10-2012-0037770, filed on Apr. 12, 2012, in the Korean Intellectual Property Office, the disclosure of which is incorporated herein by reference in its entirety.

TECHNICAL FIELD

The present invention relates to an electrolyte cell for a flow through-continuous deionization (FT-CDI), and more particularly, to an electrolyte cell for an FT-CDI that is concentrated in a concentrate by passing valuable metals through an ion exchange membrane so as to desorb the valuable metals adsorbed in a bead.

BACKGROUND

An electrolytic cell according to the related art includes a positive electrode chamber and a negative electrode chamber each having electrode plates received therein and is configured to inject a positive electrolytic solution and a negative electrolytic solution into each electrode chamber so as to be electrolyzed and discharge each electrolytic solution remaining after being electrolyzed. Further, the electrolytic cell includes an injection port and a discharge port for injecting and discharging the electrolytic solution into or from an outside of each electrode chamber.

In addition, the electrolytic solution, the concentrate, and the bead are included in the electrolytic cell so as to be a chemical reaction with one another, thereby desorbing the valuable metals in the bead.

In more detail, voltage is applied to the negative electrode chamber and the positive electrode chamber, respectively, to have polarity, thereby desorbing the valuable metals adsorbed within the bead.

In this case, the valuable metal is cation and therefore, is concentrated in the concentrate by passing through a cation exchange membrane, ions adsorbed to the bead including high-concentration valuable metal ions including dissolved ions between the positive electrode and the negative electrode are desorbed and concentrated in the concentrate, and hydrogen ions generated due to water decomposition are attached to the bead from which ions are separated.

The valuable metals are recovered based on a phenomenon of detaching and attaching ions.

In this case, there is a problem in that the concentration is gradually reduced due to the electrolysis of the bead.

Further, there is a problem in that the concentrate and the bead are not dispersed well in the entire surface and is concentrated only at one spot.

A background art of the present invention is disclosed in Korean Patent No. 10-0827929.

RELATED ART DOCUMENT

Patent Document (Patent Document 1) Korean Patent No. 10-0827929

SUMMARY

An embodiment of the present invention is directed to an electrolytic cell for an FT-CDI in which a concentrate and a bead are dispersed well without degrading the concentration of the bead.

An exemplary embodiment of the present invention provides an electrolytic cell for an FT-CDI, including: an anode electrolyte receiving plate including an anode electrolyte receiving part in which an anode electrolytic solution is received, an anode electrolyte injection port injected with the anode electrolytic solution from the outside, an anode electrolyte discharge port through which the anode electrolytic solution is discharged to the outside, a concentrate injection port injected with a concentrate from the outside, and a bead injection port injected with a bead from the outside; a cathode electrolyte receiving plate including a cathode electrolyte receiving part in which a cathode electrolytic solution is received, a cathode electrolyte injection port injected with the cathode electrolytic solution, a cathode electrolyte discharge port through which the cathode electrolytic solution is discharged, a concentrate discharge port through which the concentrate is discharged to the outside, and a bead discharge port through which the bead is discharged to the outside; at least one bead receiving plate including a bead inlet into which the bead injected from the bead injection port is injected, a bead receiving part receiving the bead injected from the bead injection port, a bead outlet through which the bead is discharged from the bead receiving part, an upper concentrate passing hole through which the concentrate injected from the concentrate injection port passes, and a lower concentrate hole through which the concentrate passes; at least one concentrate receiving plate including a concentrate inlet into which the concentrate injected from the concentrate inlet is injected, a concentrate receiving part receiving the concentrate injected from the concentrate inlet, a concentrate outlet through which the concentrate is discharged from the concentrate receiving part, an upper bead passing hole through which the bead injected from the bead injection port passes, and a lower bead passing hole through which the bead passes; and a diaphragm inserted between the bead receiving plate and the concentrate receiving plate.

The bead inlet and the bead outlet of the bead receiving plate may be each formed in a diagonal direction to each other, and the concentrate inlet and the concentrate outlet of the concentrate receiving plate may be each formed in a diagonal direction to each other.

The bead inlet may be penetrated so as to communicate with an upper bead passing hole that is disposed on the stacked concentrate receiving plate and the bead outlet may be penetrated to communicate with the lower bead passing hole that is disposed on the stacked concentrate receiving plate, and the concentrate inlet may be penetrated so as to communicate with the upper concentrate passing hole disposed on the stacked bead receiving plate and the concentrate outlet may be penetrated so as to communicate with the lower concentrate passing hole disposed on the stacked bead receiving plate.

The bead receiving plate and the concentrate receiving plate may be alternately stacked.

The bead receiving plate may include a first bead temporary receiving part disposed at a lower portion of the bead inlet and a plurality of bead inflow channels disposed at a lower portion of the first bead temporary receiving part and a second bead temporary receiving part disposed at an upper portion of the bead outlet and a plurality of bead outflow channels disposed at an upper portion of the second bead temporary receiving part.

The concentrate receiving plate may include a first concentrate temporary receiving part disposed at a lower portion of the concentrate inlet and a plurality of concentrate inflow channels disposed at a lower portion of the first concentrate temporary receiving part and a second concentrate temporary receiving part disposed at an upper portion of the concentrate outlet and a plurality of concentrate outflow channels disposed at an upper portion of the second concentrate temporary receiving part.

The bead receiving part and the concentrate receiving part may be provided with mashes.

Other features and aspects will be apparent from the following detailed description, the drawings, and the claims.

DETAILED DESCRIPTION OF EMBODIMENTS

Hereinafter, a technical spirit of the present invention will be described in detail with reference to the accompanying drawings.

However, the accompanying drawings is only an example shown for describing in more detail a technical spirit of the present invention and therefore, the technical spirit of the present invention is not limited to the accompanying drawings.

Figure 1:
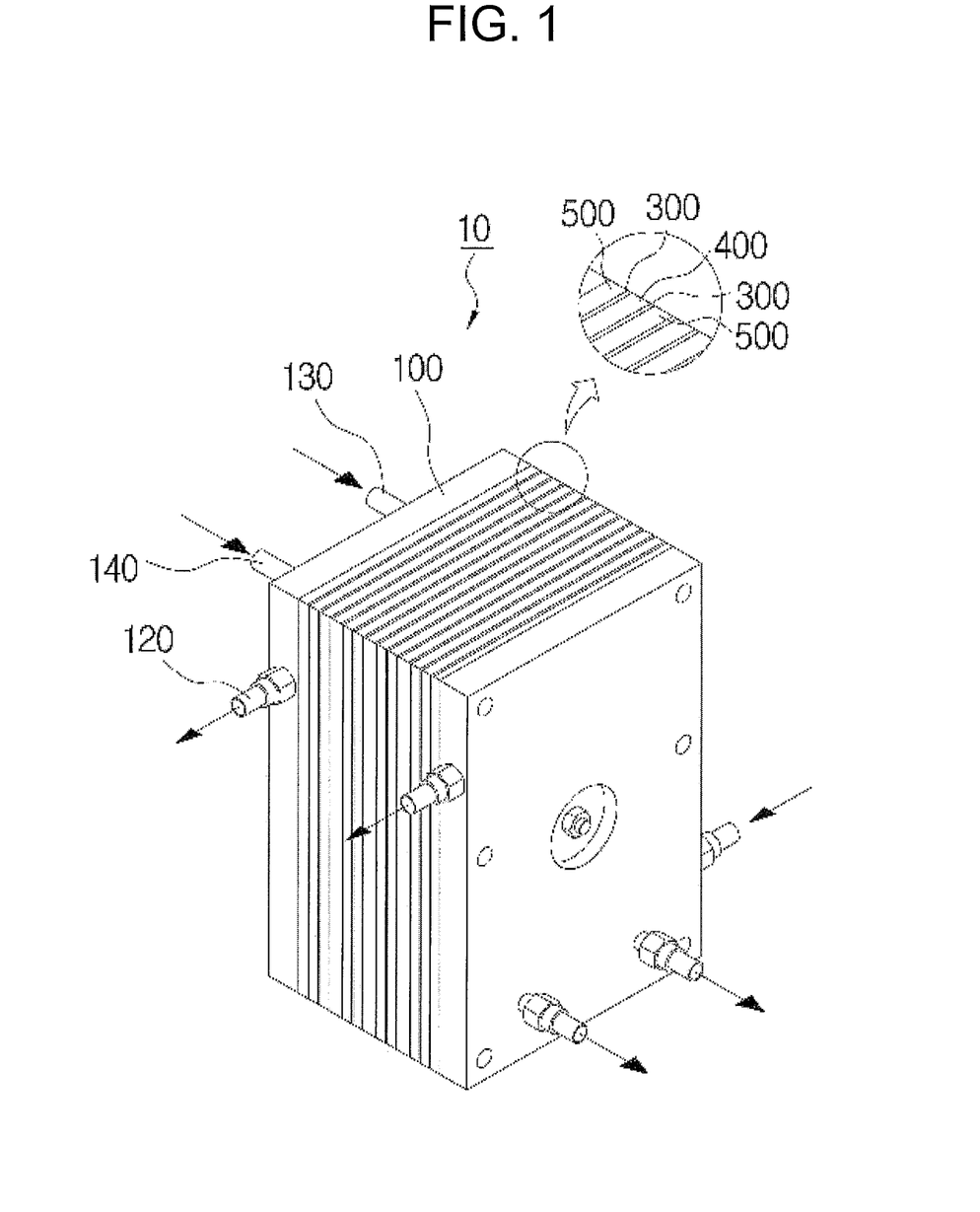
FIG. 1 is a perspective view of an electrolytic cell for an FT-CDI according to an exemplary embodiment of the present invention.
Figure 2:
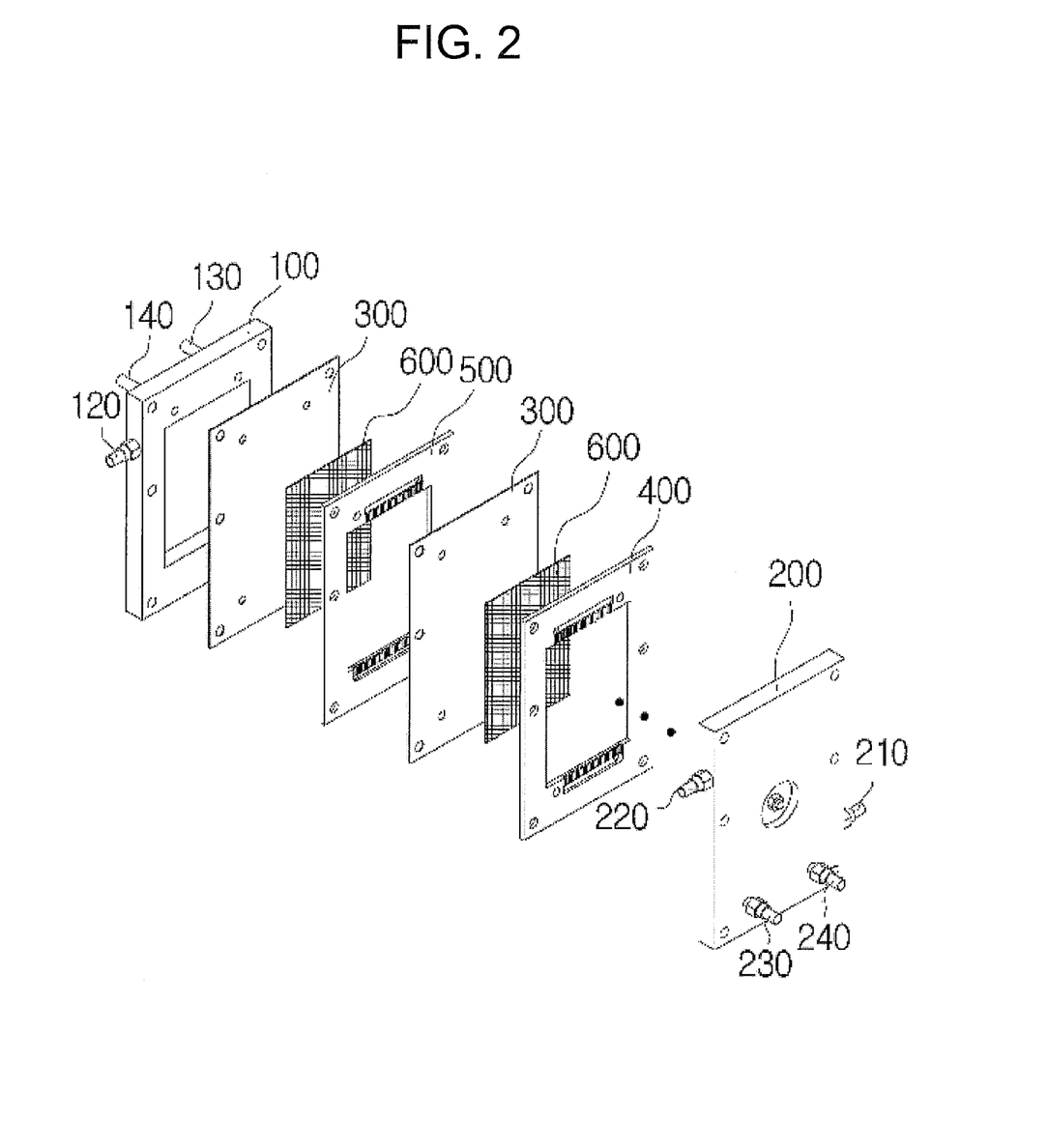
FIG. 2 is an exploded perspective view of the electrolytic cell for an FT-CDI according to the exemplary embodiment of the present invention.

The overall shape and structure of an electrolytic cell (10) for an FT-CDI according to an exemplary embodiment of the present invention will be described with reference to FIGS. 1 and 2.

The electrolytic cell (10) for an FT-CDI according to the exemplary embodiment of the present invention largely includes an anode electrolyte receiving plate (100), a cathode electrolyte receiving plate (200), at least one bead receiving plate (400), at least one concentrate receiving plate (500), and a plurality of diaphragms (300).

As illustrated in the drawings, the anode electrolyte receiving plate (100)-the diaphragm (300)-the concentrate receiving plate (500)-the diaphragm (300)-the bead receiving plate (400)-the diaphragm (300)-the cathode electrolyte receiving plate (200) are disposed in order and the concentrate receiving plate (500) and the bead receiving plate (400) may be alternately stacked.

Further, the diaphragm (300) is inserted between the bead receiving plate (400) and the concentrate receiving plate (500) and may be disposed on one surface of the anode electrolyte receiving plate (100) and the cathode electrolyte receiving plate (200).

In addition, a bead receiving part (430) disposed at the bead receiving plate (400) is provided with a mesh (600) and a concentrate receiving part (530) disposed at the concentrate receiving plate (500) may be provided with the mesh (600).

The mesh (600) is disposed at the bead receiving part (430) and the concentrate receiving part (530) to disperse the bead and the concentrate well, thereby maximizing the effect.

Figure 3:
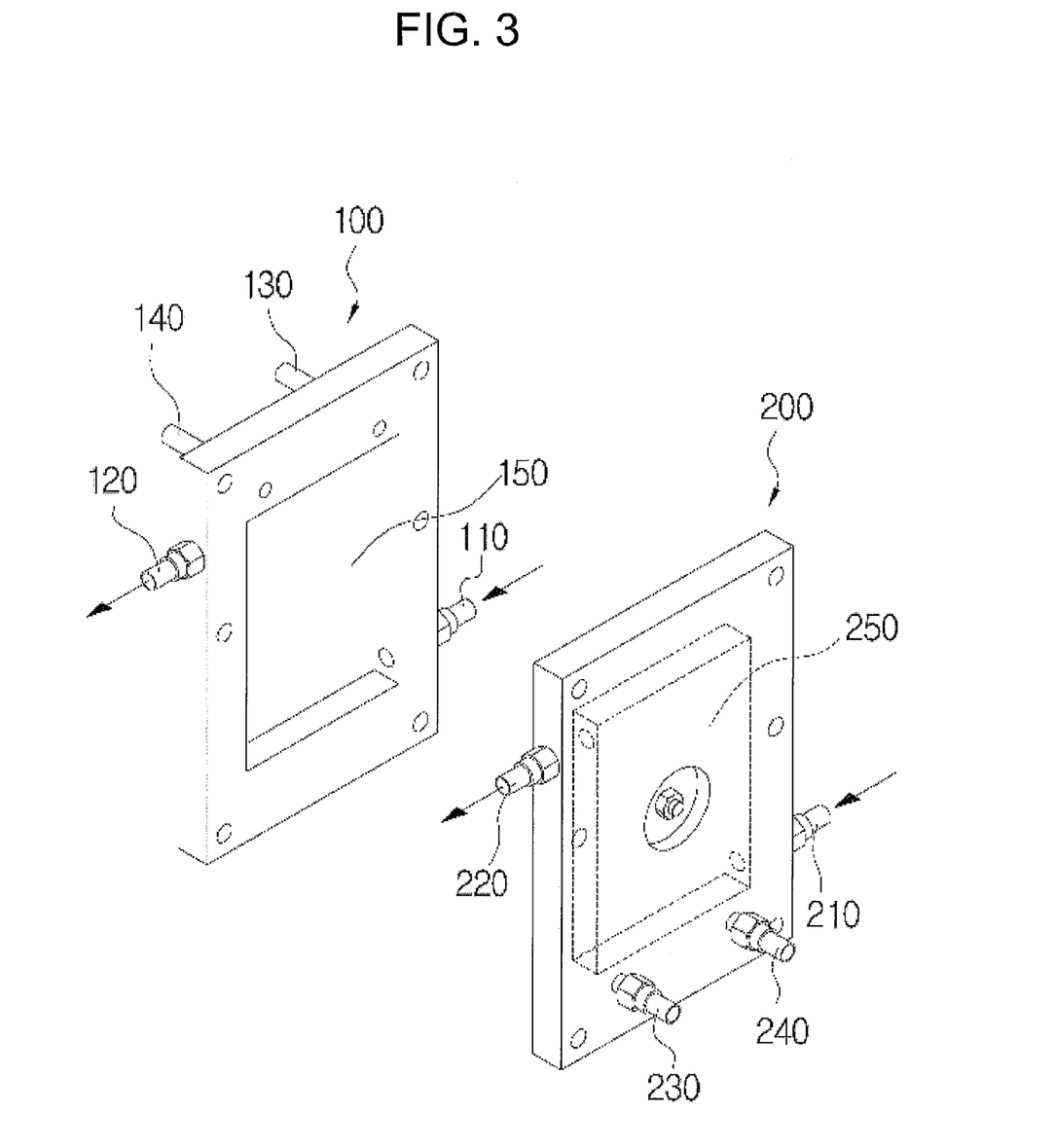
FIG. 3 is a perspective view of an anode electrolyte receiving plate and a cathode electrolyte receiving plate according to an exemplary embodiment of the present invention.

The shape and structure of the anode electrolyte receiving plate (100) and the cathode electrolyte receiving plate (200) according to the exemplary embodiment of the present invention will be described in detail with reference to FIG. 3.

The anode electrolyte receiving plate (100) includes an anode electrolyte receiving part (150), an anode electrolyte injection port (110), an anode electrolyte discharge port (120), a concentrate injection port (130), and a bead injection port (140).

The anode electrolyte injection port (110) is injected with an anode electrolytic solution from the outside and is disposed on one surface of a lower portion of the anode electrolyte receiving part (100) to communicate with the anode electrolyte receiving part (150).

The anode electrolyte discharge port (120) communicates with the anode electrolyte receiving part (150) to be disposed on the other surface of an upper portion of the anode electrolyte receiving plate (100).

Further, the anode electrolyte injection port (110) and the anode electrolyte discharge port (120) may be each disposed in a diagonal direction to each other.

The concentrate injection port (130) is injected with a concentrate to supply the concentrate to the concentrate receiving plate (500).

The bead injection port (140) is injected with the bead to supply the bead to the bead receiving plate (400).

The concentrate injection port (130) and the bead injection port (140) may be disposed at the upper portion of the anode electrolyte receiving plate (100).

The cathode electrolyte receiving plate (200) includes a cathode electrolyte receiving part (250), a cathode electrolyte injection port (210), a cathode electrolyte discharge port (220), a concentrate discharge port (230), and a bead discharge port (240).

The cathode electrolyte injection port (210) is injected with a cathode electrolytic solution from the outside and is disposed on one surface of a lower portion of the cathode electrolyte receiving part (200) to communicate with the cathode electrolyte receiving part (250).

The cathode electrolyte discharge port (220) communicates with the cathode electrolyte receiving part (250) to be disposed on the other surface of an upper portion of the cathode electrolyte receiving plate (200).

Further, the cathode electrolyte injection port (210) and the cathode electrolyte discharge port (220) may be each disposed in a diagonal direction to each other.

The concentrate discharge port (230) discharges the concentrate that is in the concentrate receiving plate (500).

The bead discharge port (240) discharges the bead that is in the bead receiving plate (400).

In this case, the concentrate discharge port (230) and the bead discharge port (240) may be disposed at the lower portion of the cathode electrolyte receiving plate (200).

Figure 4:
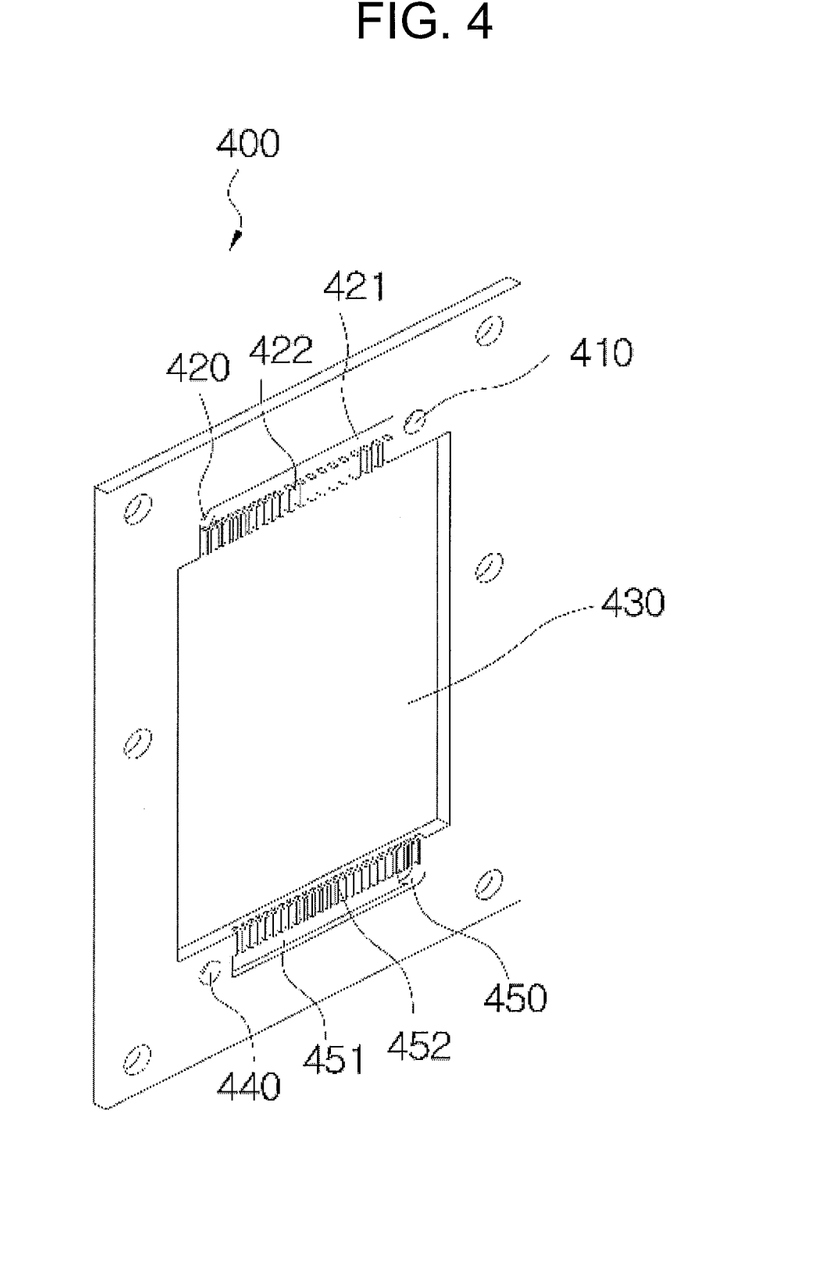
FIG. 4 is a perspective view of a bead receiving plate according to an exemplary embodiment of the present invention.

The shape and structure of the bead receiving plate (400) according to the exemplary embodiment of the present invention will be described in detail with reference to FIG. 4.

The bead receiving plate (400) includes a bead inlet (420), a bead receiving part (430), a bead outlet (450), an upper concentrate passing hole (410), and a lower concentrate passing hole (440).

The bead inlet (420) is disposed at the upper portion of the bead receiving part (430) and is penetrated so as to communicate with the bead injection port (140), such that the bead passing through the bead injection port (140) is injected into the bead receiving part (430) through the bead inlet (420).

The bead outlet (450) is disposed at the lower portion of the bead receiving part (430), discharges the bead that is received in the bead receiving part (430), and is penetrated to communicate with the bead discharge port (240) to discharge the bead to the outside through the bead discharge port (240).

In this case, the bead inlet (420) and the bead outlet (450) are each disposed in a diagonal direction to each other, such that the contact time and contact area between the bead and the diaphragm (300) can be increased.

Further, the bead receiving plate (400) includes a first bead temporary receiving part (421) disposed at the lower portion of the bead inlet (420) to be smoothly injected with the bead and includes a plurality of bead inflow channels (422) disposed at a lower portion of the first bead temporary receiving part (421) to smoothly inject the bead into the bead receiving part (430) through the bead inflow channel (422).

Further, the bead receiving plate (400) includes a second bead temporary receiving part (451) disposed at an upper portion of the bead outlet (450) and a plurality of bead outflow channels (452) disposed at an upper portion of the second bead temporary receiving part (451), such that the bead that is in the bead receiving part (430) may be smoothly discharged to the bead outlet (450).

The upper concentrate passing hole (410) is disposed at the upper portion of the bead receiving part (430) and is penetrated so as to communicate with the concentrate injection port (130), such that the concentrate passing through the concentrate outlet (130) passes through the upper concentrate passing hole (410).

The lower concentrate passing hole (440) is disposed at the lower portion of the bead receiving part (430) and is penetrated so as to communicate with the concentrate discharge port (230), such that the concentrate is discharged to the outside through the concentrate discharge port (230).

Figure 5:
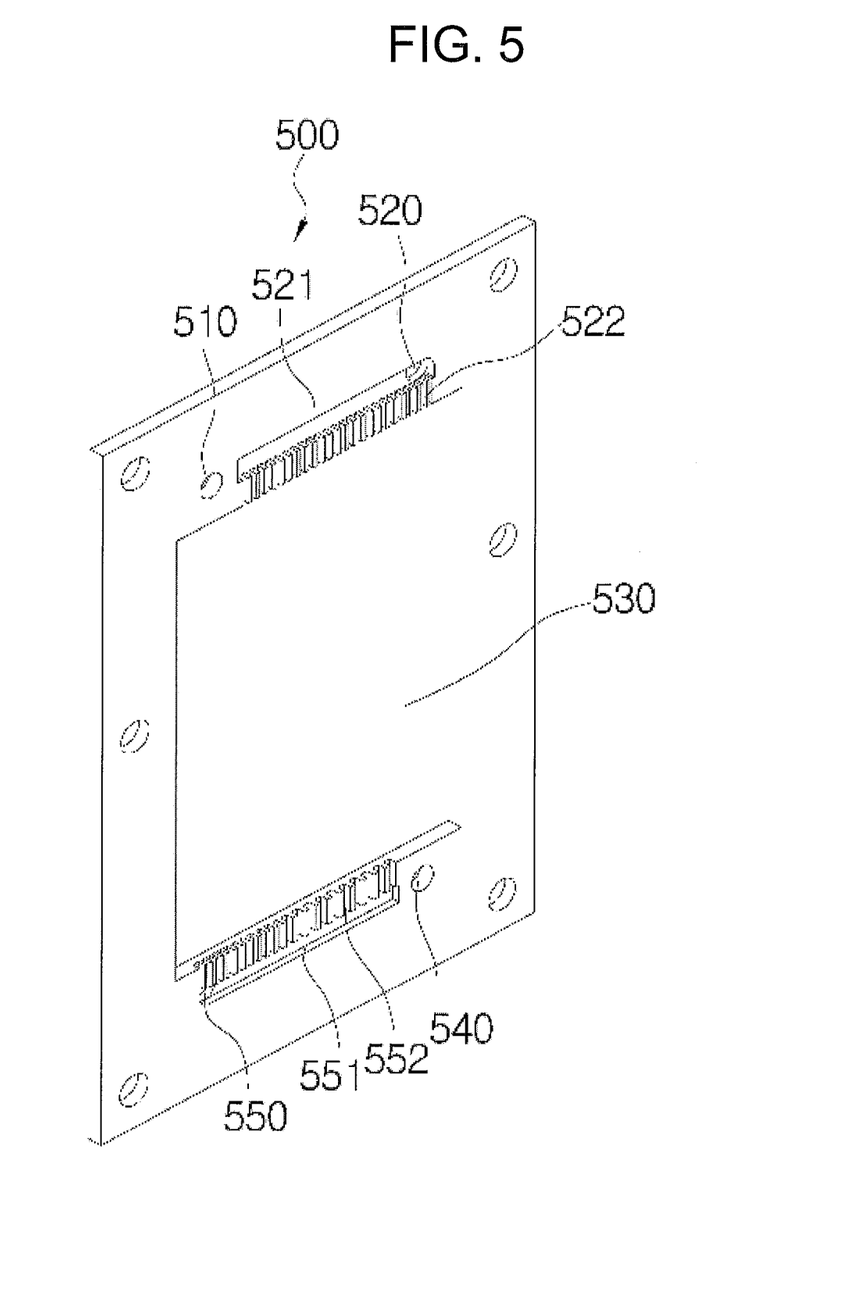
FIG. 5 is a perspective view of a concentrate receiving plate according to an exemplary embodiment of the present invention.

The shape and structure of the concentrate receiving plate (500) according to the exemplary embodiment of the present invention will be described in detail with reference to FIG. 5.

The concentrate receiving plate (500) includes a concentrate inlet (520), a concentrate receiving part (530), a concentrate outlet (550), an upper bead passing hole (510), and a lower bead passing hole (540).

The concentrate inlet (520) is disposed at an upper portion of the concentrate receiving part (530) and is penetrated so as to communicate with the concentrate injection port (130), such that the concentrate passing through the concentrate injection port (130) are injected into the concentrate receiving part (530) through the concentrate inlet (520).

The concentrate outlet (550) is disposed at the lower portion of the concentrate receiving part (530), discharges the concentrate that is received in the concentrate receiving part (530), and is penetrated to communicate with the concentrate discharge port (230) to discharge the concentrate to the outside through the concentrate discharge port (230).

In this case, the concentrate inlet (520) and the concentrate outlet (550) are each disposed in a diagonal direction to each other, such that the contact time and contact area between the concentrate and the diaphragm (300) can be increased.

Further, the concentrate receiving plate (500) includes a first concentrate temporary receiving part (521) disposed at the lower portion of the concentrate inlet (520) to be smoothly injected with the concentrate and includes a plurality of concentrate inflow channels (522) disposed at a lower portion of the first concentrate temporary receiving part (521) to smoothly inject the concentrate into the concentrate receiving part (530) through the concentrate inflow channel (522).

Further, the concentrate receiving plate (500) includes a second concentrate temporary receiving part (551) disposed at an upper portion of the concentrate outlet (550) and a plurality of bead outflow channels (552) disposed at an upper portion of the second concentrate temporary receiving part (551), such that the concentrate that is in the concentrate receiving part (530) may be smoothly discharged to the concentrate outlet (550).

The upper bead passing hole (510) is disposed at the upper portion of the concentrate receiving part (530) and is penetrated so as to communicate with the bead injection port (140), such that the bead passing through the bead injection port (140) passes through the upper bead passing hole (510).

The lower bead passing hole (540) is disposed at the lower portion of the concentrate receiving part (530) and is penetrated so as to communicate with the bead discharge port (240), such that the bead is discharged to the outside through the concentrate discharge port (240).

Figure 6:
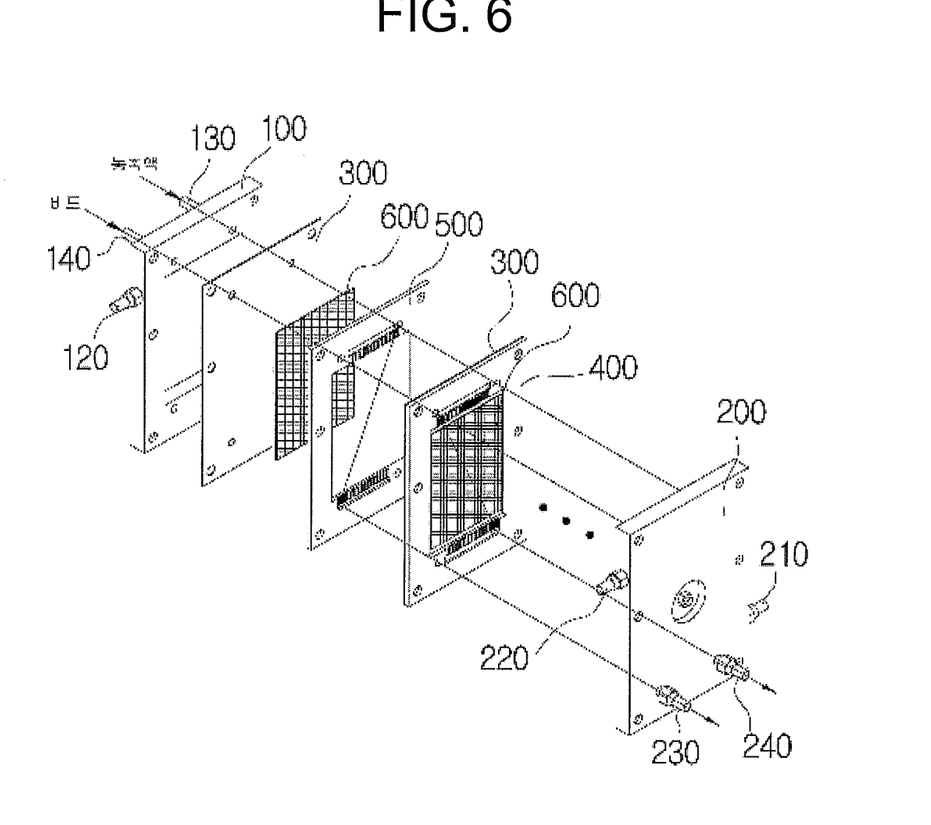
FIG. 6 is an exploded perspective view illustrating a flow of the bead and the concentrate according to an exemplary embodiment of the present invention.

The circulation of the bead and the concentrate of the electrolytic (10) for an FT-CDI according to the exemplary embodiment of the present invention will be described in detail with reference to FIG. 6.

The bead receiving plate (400) and the concentrate receiving plate (500) are alternately stacked so that the bead inlet (420) is penetrated so as to communicate with the upper bead passing hole (510) disposed on the stacked concentrate receiving plate (500) and the bead outlet (450) is penetrated so as to communicate the lower bead passing hole (540) disposed on the stacked concentrate receiving plate (500).

Further, the concentrate inlet (520) is penetrated so as to communicate with the upper concentrate passing hole (410) disposed on the stacked bead receiving plate (400) and the concentrate outlet (550) is penetrated so as to communicate with the lower concentrate passing hole (440) disposed on the stacked bead receiving plate (400).

In the electrolytic cell (10), the bead is injected into the bead inlet (420) from the outside and a part of the injected bead is injected into the bead receiving part (430) through the bead inlet (420) that is disposed on the bead receiving plate (400) and a part thereof passes through the upper bead passing hole (510) that is disposed on the concentrate receiving plate (500) and is then injected into the bead receiving part (430) through the bead inlet (420) that is disposed on the stacked bead receiving plate (400).

The bead is injected into the bead receiving part (430) and is then uniformly dispersed via the mesh (600) to be reacted, such that the bead is discharged to the bead outlet (450) and is then discharged to the bead discharge port (240).

The bead discharged to the bead discharge port (240) is stored in a bead storage unit and the bead again injected from the bead storage unit to the bead injection port (140) is injected to the electrolytic cell (10) again.

In the electrolytic cell (10), the concentrate is injected into the concentrate injection port (130) from the outside and a part of the injected concentrate is injected into the concentrate receiving part (530) through the concentrate inlet (520) that is disposed on the concentrate receiving plate (500) and a part thereof passes through the upper concentrate passing hole (410) that is disposed on the bead receiving plate (400) and is then injected into the concentrate receiving part (530) through the concentrate inlet (520) that is disposed on the stacked concentrate receiving plate (500).

The concentrate is injected into the concentrate receiving part (530) and is then uniformly dispersed via the mesh (600) to be reaction, such that the concentrate is discharged to the concentrate outlet (550) and is then discharged to the concentrate discharge port (230).

The concentrate discharged to the concentrate discharge port (230) is stored in a concentrate storage unit and the concentrate again injected from the concentrate storage unit to the concentrate injection port (130) is injected to the electrolytic cell (10) again.

Therefore, the electrolytic cell (10) for an FT-CDI according to the exemplary embodiments of the present invention are each provided with the bead injection port (140) and the concentrate injection port (130) into which the bead and the concentrate are injected and the bead discharge port (240) and the concentrate discharge port (230) through which the bead and the concentrate are discharged, respectively, to circulate the bead, thereby preventing the concentration of the bead from being degraded and disposes the mesh (600) at a place in which the concentrate and the bead are received to disperse the concentrate and the bead well.

According to the exemplary embodiments of the present invention, the electrolytic cell for an FT-CDI includes the injection port into which the bead and the concentrate are injected and the discharge port through which the bead and the concentrate are discharged to circulate the bead, thereby preventing the concentration of the bead from being degraded and disposes the mesh at a place in which the concentrate and the bead are received to disperse the concentrate and the bead well.

The present invention is not limited to the aforementioned exemplary embodiment and an application range is various and it is apparent that various modifications can be made to those skilled in the art without departing from the spirit of the present invention described in the appended claims.

What is claimed is:

1. An electrolytic cell for an FT-CDI, comprising:
an anode electrolyte receiving plate including an anode electrolyte receiving part in which an anode electrolytic solution is received, an anode electrolyte injection port injected with the anode electrolytic solution from the outside, an anode electrolyte discharge port through which the anode electrolytic solution is discharged to the outside, a concentrate injection port injected with a concentrate from the outside, and a bead injection port injected with a bead from the outside;
a cathode electrolyte receiving plate including a cathode electrolyte receiving part in which a cathode electrolytic solution is received, a cathode electrolyte injection port injected with the cathode electrolytic solution, a cathode electrolyte discharge port through which the cathode electrolytic solution is discharged, a concentrate discharge port through which the concentrate is discharged to the outside, and a bead discharge port through which the bead is discharged to the outside; and
at least one bead receiving plate including a bead inlet into which the bead injected from the bead injection port is injected, a bead receiving part receiving the bead injected from the bead inlet, a bead outlet through which the bead is discharged from the bead receiving part, an upper concentrate passing hole through which the concentrate injected from the concentrate injection port passes, and a lower concentrate passing hole through which the concentrate passes, wherein the bead inlet and the bead outlet of the bead receiving plate are each formed in a diagonal direction to each other;
wherein the bead receiving plate further comprises:
a first bead temporary receiving part disposed at a lower portion of the bead inlet and a plurality of bead inflow channels disposed at a lower portion of the first bead temporary receiving part, and
a second bead temporary receiving part disposed at an upper portion of the bead outlet and a plurality of bead outflow channels disposed at an upper portion of the second bead temporary receiving part;
wherein the bead inlet is formed at one side of and at substantially the same height as the first bead temporary receiving part;
wherein the bead outlet is formed at one side of and at substantially the same height as the second bead temporary receiving part;
wherein the upper concentrate passing hole is formed at a location within a horizontal boundary defined by a left side and a right side of the bead receiving part and within a vertical boundary defined by an upper end of the bead receiving part and an upper end of the first bead temporary receiving part;
wherein the lower concentrate passing hole is formed at a location within a horizontal boundary defined by the left side and the right side of the bead receiving part and a vertical boundary defined by a lower end of the bead receiving part and a lower end of the second bead temporary receiving part;
wherein the width of the bead temporary receiving parts is smaller than that of the bead receiving part;
at least one concentrate receiving plate including a concentrate inlet into which the concentrate injected from the concentrate injection port is injected, a concentrate receiving part receiving the concentrate injected from the concentrate inlet, a concentrate outlet through which the concentrate is discharged from the concentrate receiving part, an upper bead passing hole through which the bead injected from the bead injection port passes, and a lower bead passing hole through which the bead passes, wherein the concentrate inlet and the concentrate outlet of the concentrate receiving plate are each formed in a diagonal direction to each other;
wherein the concentrate receiving plate comprises:
a first concentrate temporary receiving part disposed at a lower portion of the concentrate inlet and a plurality of concentrate inflow channels disposed at a lower portion of the first concentrate temporary receiving part, and
a second concentrate temporary receiving part disposed at an upper portion of the concentrate outlet and a plurality of concentrate outflow channels disposed at an upper portion of the second concentrate temporary receiving part;
wherein the concentrate inlet is formed at one end of and at substantially the same height as the first concentrate temporary receiving part;
wherein the concentrate outlet is formed at one end of and at substantially the same height as the second concentrate temporary receiving part;
wherein the upper bead passing hole is formed at a location within a horizontal boundary defined by a left side and a right side of the concentrate receiving part and within a vertical boundary defined by an upper end of the concentrate receiving part and an upper end of the first concentrate temporary receiving part;

wherein the lower bead passing hole is formed at a location within a horizontal boundary defined by the left side and the right side of the concentrate receiving part and a vertical boundary defined by a lower end of the concentrate receiving part and a lower end of the second concentrate temporary receiving part;

a diaphragm inserted between the bead receiving plate and the concentrate receiving plate wherein the bead inlet is penetrated so as to communicate with an upper bead passing hole that is disposed on the stacked concentrate receiving plate and the bead outlet is penetrated to communicate with the lower bead passing hole that is disposed on the stacked concentrate receiving plate;

wherein the concentrate inlet is penetrated so as to communicate with the upper concentrate passing hole disposed on the stacked bead receiving plate and the concentrate outlet is penetrated so as to communicate with the lower concentrate passing hole disposed on the stacked bead receiving plate.

2. The electrolytic cell for an FT-CDI of claim 1, wherein the bead receiving plate and the concentrate receiving plate are alternately stacked.

3. The electrolytic cell for an FT-CDI of claim 1, wherein the bead receiving part and the concentrate receiving part are provided with mesh.

* * * * *